N. J. SHAEFFER.
PLANTER.
APPLICATION FILED OCT. 19, 1910.
1,143,733.
Patented June 22, 1915.
3 SHEETS—SHEET 1.
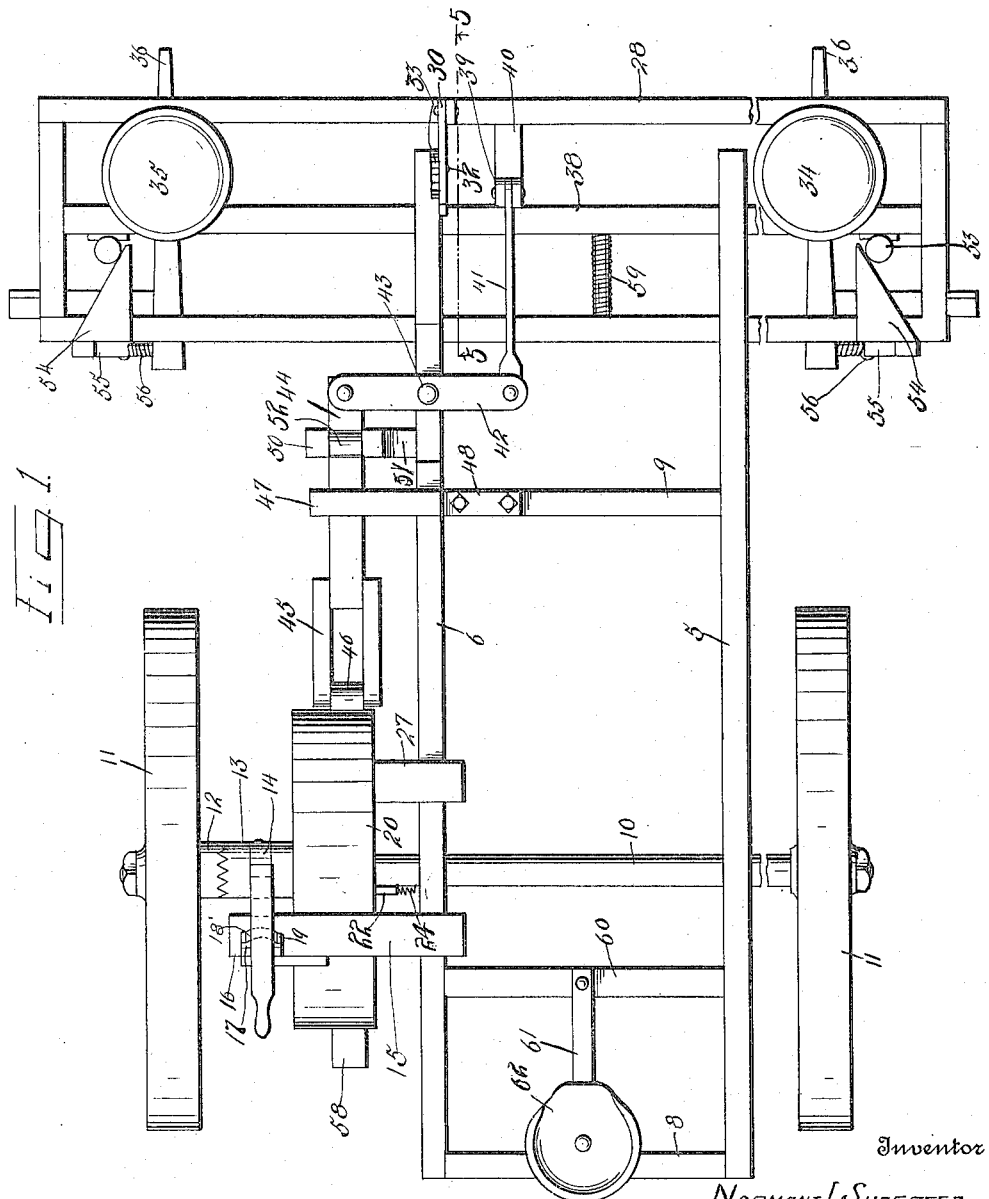

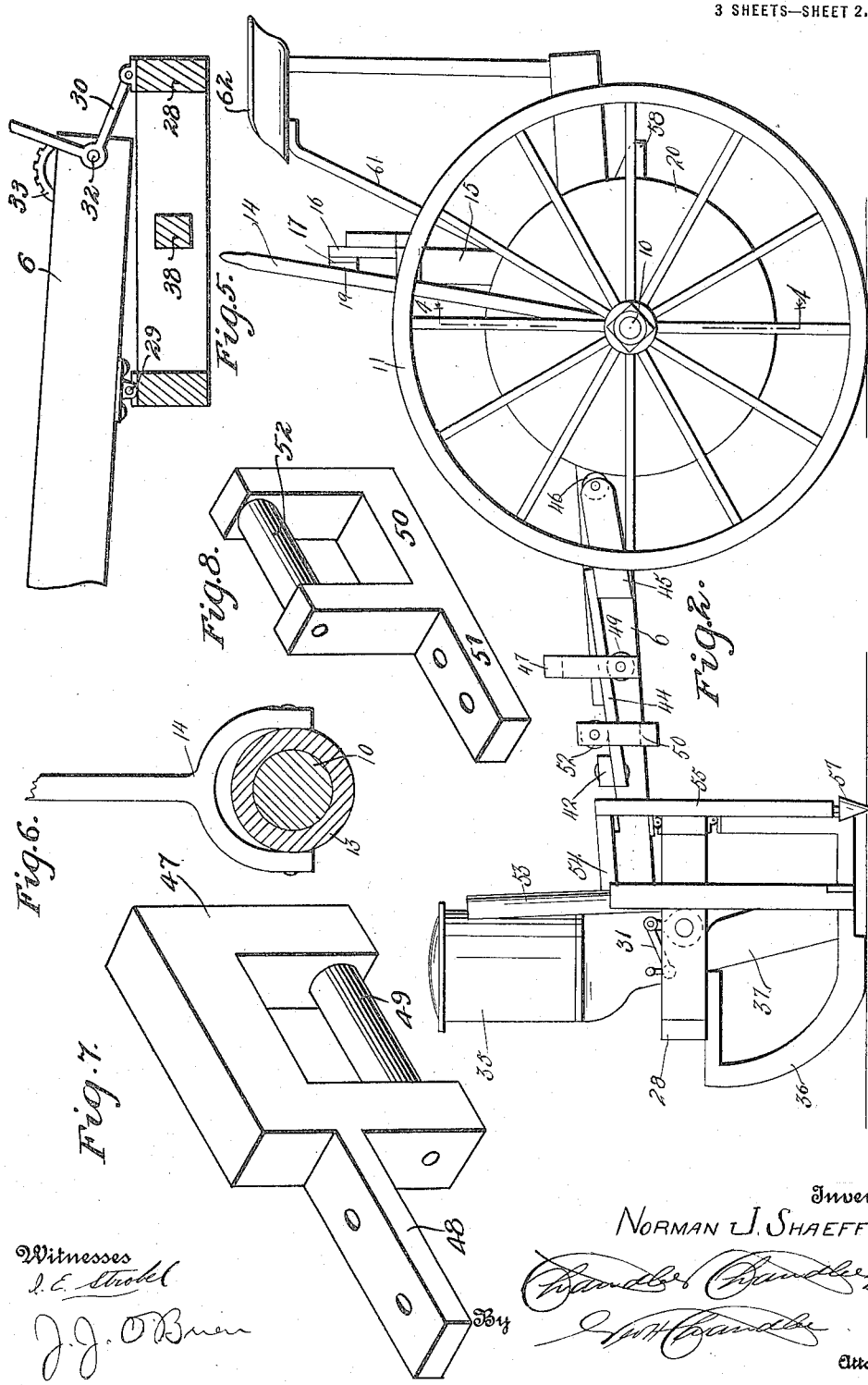

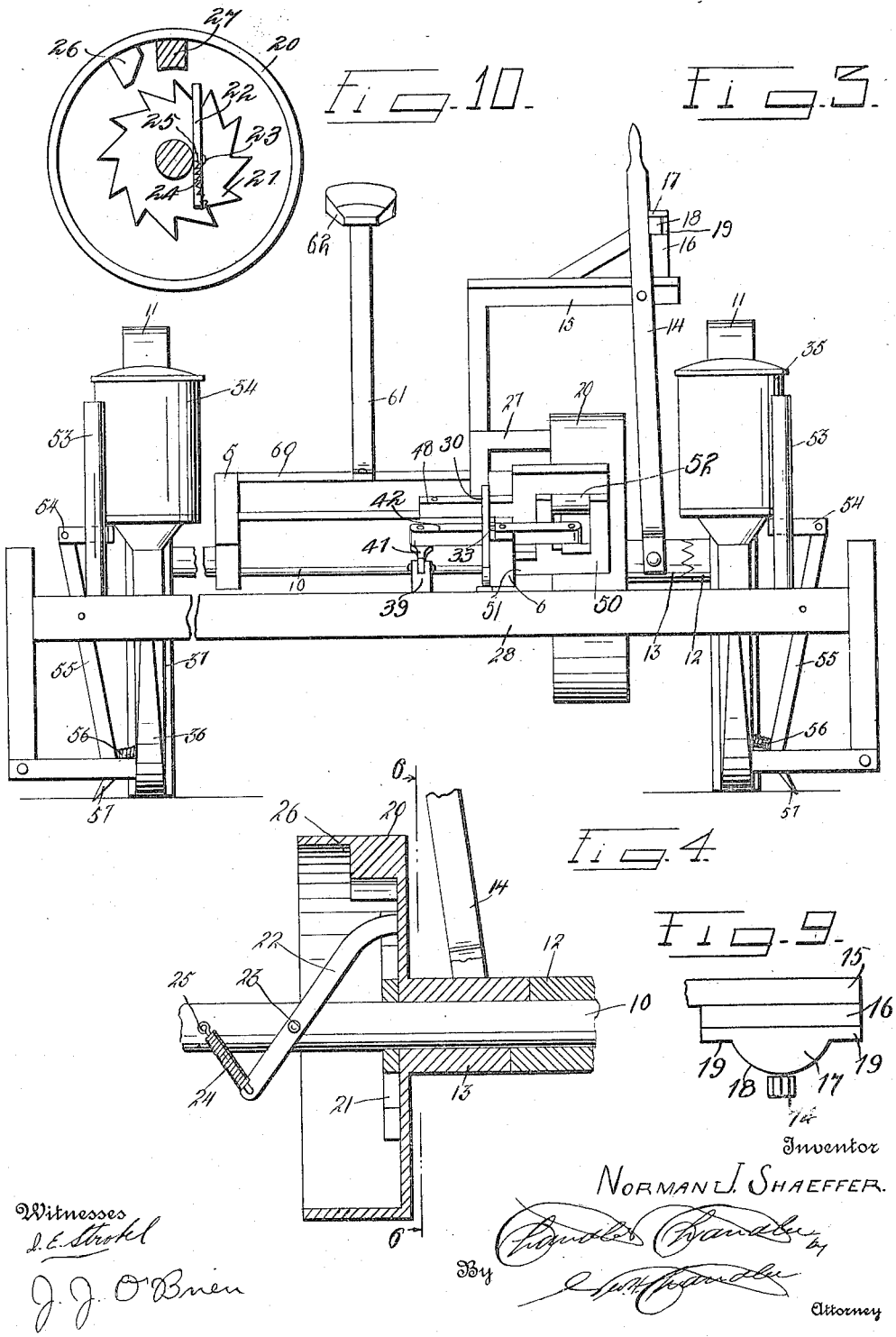

UNITED STATES PATENT OFFICE.

NORMAN J. SHAEFFER, OF WOODWARD, IOWA.

PLANTER.

1,143,733.　　　　Specification of Letters Patent.　　Patented June 22, 1915.

Application filed October 19, 1910. Serial No. 587,937.

*To all whom it may concern:*

Be it known that I, NORMAN J. SHAEFFER, a citizen of the United States, residing at Woodward, in the county of Dallas, State of Iowa, have invented certain new and useful Improvements in Planters; and I do hereby declare the following to be a full, clear, and exact description of the invention, such as will enable others skilled in the art to which it appertains to make and use the same.

This invention relates to improvements in corn planters and the leading object is to provide direct crank mechanism for operating the seed valves of a pair of seed boxes having connection with the drive axle and operating on roller bearings whereby binding of the various parts of the crank trip mechanism is prevented.

With the above and other objects in view the invention consists in certain constructions, combinations and arrangement of parts, clearly described in the following specification and clearly illustrated in the accompanying drawings, in which:—

Figure 1 is a plan view of the improved device. Fig. 2 is a side elevation. Fig. 3 is a front elevation. Fig. 4 is a detail sectional view on an enlarged scale showing the construction of one of the clutch elements and the ratchet mechanism therefor taken on the line 4—4 of Fig. 2. Fig. 5 is a detail sectional view of the seed box supporting frame and the means for tilting said frame taken on the line 5—5 of Fig. 1. Fig. 6 is a detail sectional view of a spanner for operating the movable clutch element taken on the line 6—6 of Fig. 4. Fig. 7 is a detail perspective view of one of the roller bearing guides for the crank trip mechanism. Fig. 8 is a detail perspective view of another roller bearing guide for the crank trip mechanism. Fig. 9 is a detail plan view of a stop for the clutch lever, and Fig. 10 is a detail elevational view of the drum and its ratchet mechanism.

Referring to the accompanying drawings 5 and 6 denote the side members of the frame and are connected at their rear ends by a cross bar 8 and near the forward ends by a cross bar 9. Near the rear ends of the frame members 5 and 6 an axle 10 is journaled, and on the ends of said axle 10 traction wheels 11 are mounted. One of the traction wheels 11 has secured thereto a clutch element 12 which is engaged by a movable clutch element 13. The movable clutch element 13 is engaged by a spanner lever 14 which is pivoted upon a bracket 15 suitably secured to the frame member 6. The bracket 15 supports a small post 16 which carries on its upper end a stop member 17 having a curved face 18 and shoulders 19, which shoulders are adapted to hold the upper end of the lever 14 against movement. On the axle 10 a drum 20 is slidably and rotatably mounted, said drum 20 being connected with the clutch element 13 and movable therewith. The drum 20 contains a ratchet wheel 21 which is engaged by a pawl lever 22 pivoted at 23 to the axle 10 and engaged at its outer end by a coiled spring 24, one end of said spring being secured at 25 to said axle 10, whereby the inner end of the pawl lever 22 will be normally held against the teeth of the ratchet 21 and the drum and clutch element will be locked to the axle 10. The drum 20 contains a beveled stop 26 which engages a bracket arm 27 projecting laterally of the frame member 6 into said drum, whereby the drum will be held from rotation on the axle 10 when the clutch element 13 is disengaged from the clutch element 12 by the movement of the drum away from said clutch element 12.

On the forward end of the frame members 5 and 6 the seed box supporting frame 28 is hingedly secured by means of hinges 29 and a bell crank lever 30 is pivoted at its lower arm to the frame 28 and pivotally supported on the frame member 6 by the pivot 32.

A rack bar 33 is provided whereby the lever 30 can be held in adjusted position. The frame 28 supports seed boxes 34 and 35 which are provided with suitable seed valves not shown operatively disposed near the discharge openings thereof. Below the discharge openings of the seed boxes 34, 35 the shoes or furrow openers 36 are positioned and rearwardly of the shoes 36 drills or conducting tubes 37 are supported. A rock shaft 38 is journaled in the ends of the frame 28 and said rock shaft 38 is provided intermediate of its ends with the crank arm 39 extending thereabove which is adapted to abut against a stop 40 located on the forward crossmember of the frame 28. The crank arm 39 is connected by a rearwardly extending pitman 41 with the lever 42 which is pivoted at 43 to the forward end of the side member 6 and which is pivoted at its other end to the operating rod or bar 44. The operating rod or bar 44 carries a yoke 45 on its rear end and a roller bearing 46 is journaled to the rear of said yoke 45 and is adapted to engage the periphery of the drum 20. The operating rod or bar 44 is preferably formed flat and operates through a bracket 47 which is yoke-shaped and which is secured by an arm 48 to the frame member 6. The bracket yoke 47 carries a roller bearing 49 which supports the operating rod or bar 44. Forwardly of the bracket yoke 47 a second bracket yoke 50 is mounted by the arm 51 to the frame member 6 and said bracket yoke 50 carries a roller bearing 52 which engages the upper surface of the operating bar or rod 44.

The operating shaft 38 carries vertical arms 53 located near the ends thereof and said arms are adapted to engage with the triangular members of cams 54 which are supported on the upper ends of marker arms 55 and said arms 55 in turn carry the ground engaging arms or pointers 57. The arms 55 are pivoted to the bar of frame 28. These arms 55 are normally held out at their lower ends by means of springs 56. The drum 20 is provided with an external abutment 58 which engages with the roller bearing 46 whereby the operating rod or bar 44 will be moved forwardly on a horizontal plane when the drum 20 is rotated.

When the operating rod or bar 44 is actuated by the drum 20 the pitman 41 will be moved rearwardly owing to the horizontal rocking of the lever 42 and the rock shaft 38 will be rocked. The rock shaft 38 is connected by a coiled spring 59 with the rear cross bar of the frame 28 for returning said shaft and operating parts to an operative position and has suitable crank connection 31 with the seed valves of the boxes 34 and 35. On the rear ends of the cross bars 5 and 6 a cross bar 60 is secured and said cross bar 60 supports a seat post 61 which carries a suitable seat 62 on its upper end.

What is claimed is:—

1. In a corn planter, a wheeled frame having a drive axle, a drum slidable on the drive axle and provided with a peripheral flange having an abutment member extending outwardly therefrom, seed boxes mounted on the frame and provided with discharge valves, a rock shaft journaled adjacent to the seed boxes and having connection with the valves thereof, guides projecting laterally from the frame, a rod slidable through the guides and having an engaging member at its rear end for contact by the abutment block of the drum and connections between the forward end of the rod and the rock shaft whereby forward movement of the rod imparted thereto through the block will rock the shaft.

2. In a corn planter, a wheeled frame having a drive axle, a drum slidable on the drive axle and provided with a peripheral flange having an abutment member extending outwardly therefrom, seed boxes mounted on the frame and provided with discharge valves, a rock shaft journaled adjacent to the seed boxes and having connection with the valves thereof, guides projecting laterally from the frame and provided with spaced rollers, a rod movable between the rollers and having an engaging member at its rear end for contact by the abutment block of the drum, connections between the forward end of the rod and the rock shaft whereby forward movement of the rod imparted thereto through the block will rock the shaft and resilient means connected to the frame and rock shaft for returning said parts to an operative position.

3. In a planter, a frame having a drive axle, a flanged drum loosely mounted on the axle, said drum having an integral inwardly projecting stop, an arm carried by the frame and extending within the drum for contact with the stop to prevent rotation of the drum when the clutch elements are disengaged, an angular arm extending from one side of the frame above the drum, an operating lever pivoted to the last named arm and connected with the movable clutch member for shifting the latter to an inoperative position, means for holding said lever in opposite positions, bracket guides extending from one side of the block, an operating rod slidable in the guides, rollers carried by the guides upon opposite sides of the rod, a yoke at the rear end of the rod provided with a roller normally contacting with the drum, said drum having a peripheral projection to engage the roller and operate the rod, a lever pivoted to the frame and the forward end of the rod, a rock shaft journaled transversely of the frame, a pitman connected to the other end of the lever and to an upward extending arm of the rock shaft, a spring connected to the frame and engaging the shaft to hold the latter in an inoperative position, a stop carried by the frame limiting the movement of the rock shaft, seed boxes on the frame and provided with valves connected to the rock shaft and marking means adjacent the seed boxes simultaneously operated with the seed valves.

In testimony whereof, I affix my signature, in presence of two witnesses.

NORMAN J. SHAEFFER.

Witnesses:
E. B. RIVERS,
FRED SCHNOOR.

Copies of this patent may be obtained for five cents each, by addressing the "Commissioner of Patents, Washington, D. C."